July 26, 1938.  R. W. WARING ET AL  2,124,960
MEANS FOR INDICATING BRAKING ACTION
Original Filed Dec. 14, 1928  2 Sheets-Sheet 1
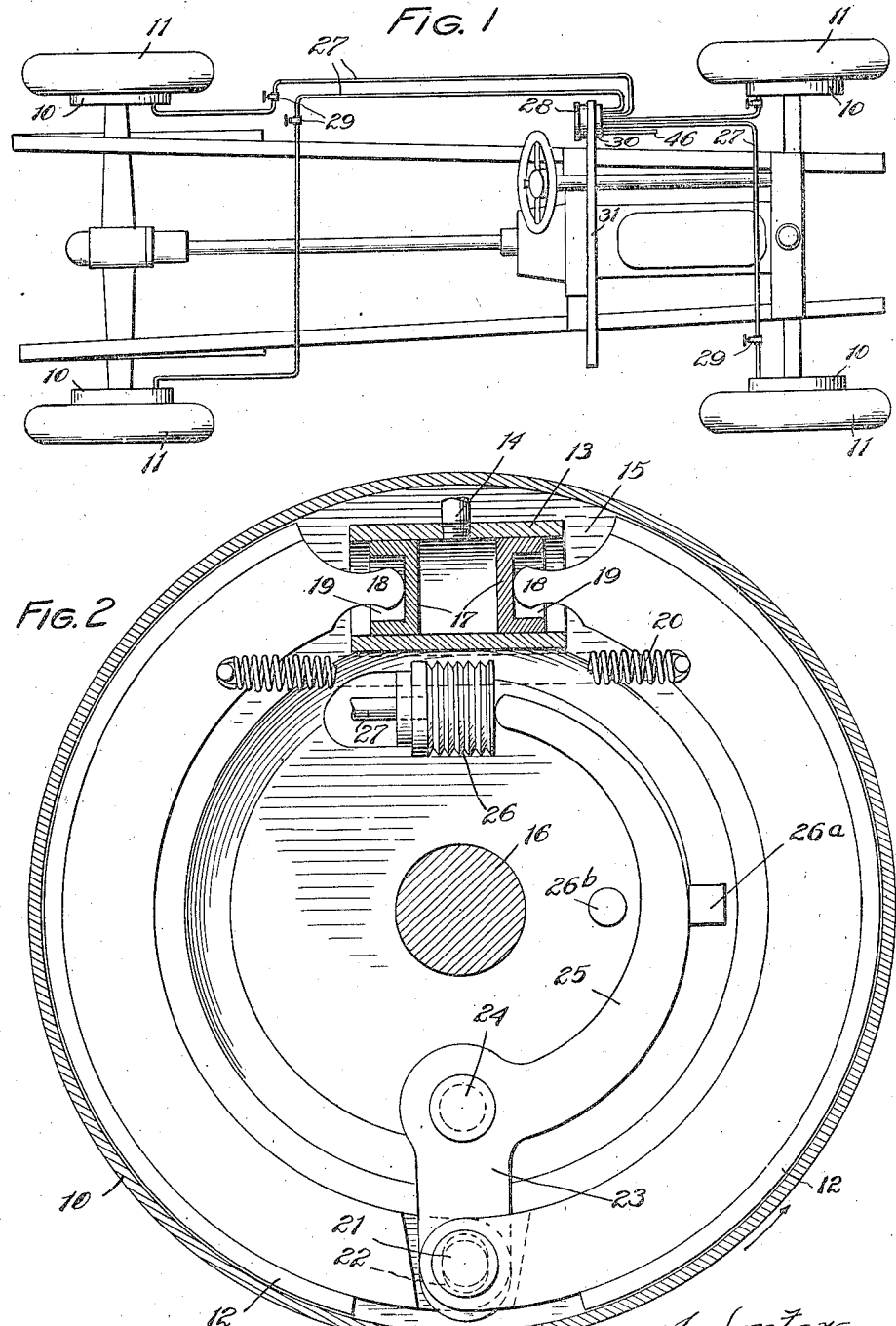

July 26, 1938. R. W. WARING ET AL 2,124,960
MEANS FOR INDICATING BRAKING ACTION
Original Filed Dec. 14, 1928   2 Sheets-Sheet 2
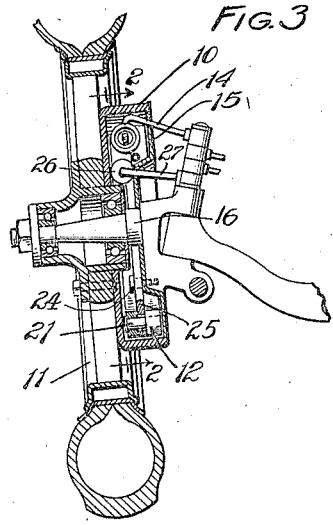
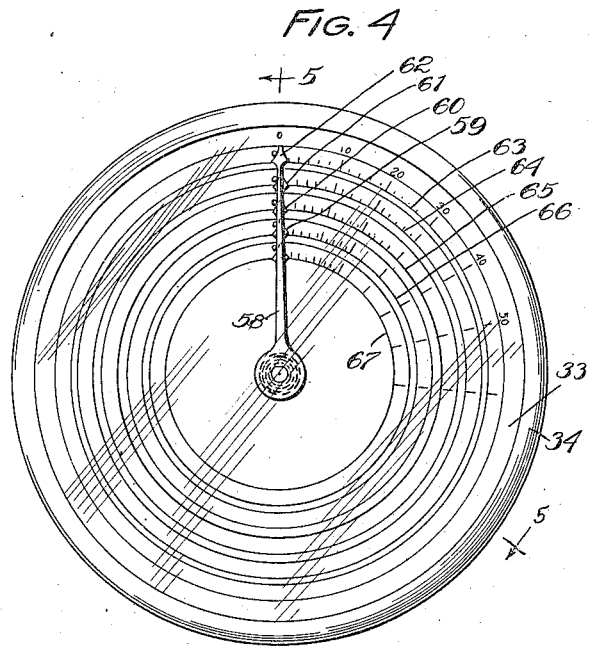
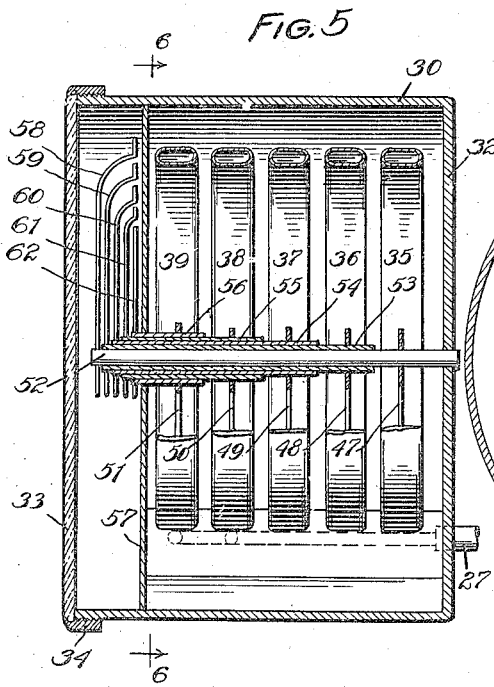
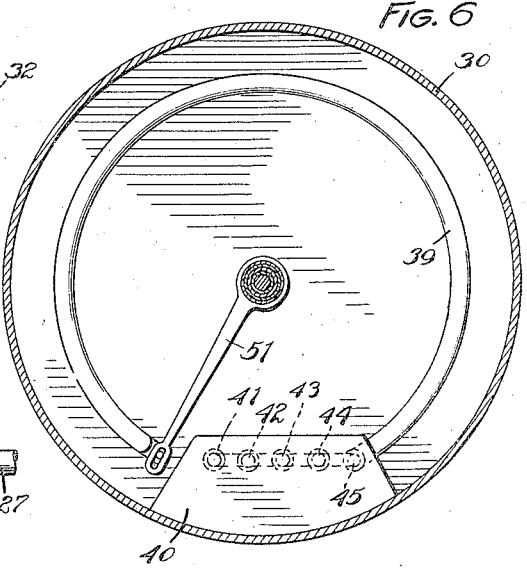
Inventors
Robert W. Waring
Richard F. Fahey
By Churchill Parker Carlson
Attys Patented July 26, 1938

2,124,960

UNITED STATES PATENT OFFICE 2,124,960

MEANS FOR INDICATING BRAKING ACTION

Robert W. Waring and Richard J. Fahey, Evanston, Ill.; said Waring assignor to said Fahey Application December 14, 1928, Serial No. 325,962
Renewed December 24, 1937

7 Claims. (Cl. 265—24)

The present invention relates to a new and improved means for indicating braking action, and although adaptable to a large variety of brakes, it is particularly applicable to automobile brakes.

An important object of the present invention resides in the provision of novel means which will indicate the action and effectiveness of a brake by measuring the braking torque.

Another object is to provide a novel means of this character which will register the action of the brake at a point remote therefrom, for example at the dash of an automobile.

In most motor vehicles, for example in automobiles, a plurality of brakes, usually two or four, are provided. The action of these brakes should be balanced. Ordinarily it is difficult to determine when the brakes are out of balance, and to set and test the brakes so as to bring them into accurately balanced relation. An important object of the present invention therefore resides in the provision of a novel braking system comprising means for indicating the relative braking action of a plurality of brakes. As a result, the working condition of the brakes is revealed whenever the brakes are operated, and the brakes can be set and tested accurately and expeditiously.

Another important object is to provide a novel means for testing brakes which will indicate the efficiency of any one or more of the brakes by comparison of the braking action to the power applied to the brake.

Most of the brakes in common use comprise a brake drum, an internal or external brake member, and means for manipulating the latter into or out of engagement with the drum. A specific object of the present invention resides in the provision of novel means for registering the torque exerted through friction by the brake drum on the brake member when the brake is applied.

A further object resides in the provision of novel means of the foregoing character which is relatively simple and inexpensive in construction, and which is efficient and accurate in operation.

Further objects and advantages will become apparent as the description proceeds.

In the accompanying drawings, Figure 1 is a plan view, diagrammatic in character, of a braking system embodying the features of our invention.

Fig. 2 is an enlarged sectional detail view of one of the brakes, taken along line 2—2 of Fig. 3.

Fig. 3 is an axial sectional view through one of the brakes and the wheel to which it is applied.

Fig. 4 is a front elevational view of a suitable indicating device.

Fig. 5 is a sectional view taken along line 5—5 of Fig. 4.

Fig. 6 is a transverse sectional view taken along line 6—6 of Fig. 5.

While the invention is susceptible of various modifications and alternative constructions, we have shown in the drawings and will herein describe in detail the preferred embodiment, but it is to be understood that we do not thereby intend to limit the invention to the specific form disclosed, but intend to cover all modifications and alternative constructions falling within the spirit and scope of the invention as expressed in the appended claims.

The invention in its broadest concept is applicable to a large variety of brakes, but for purposes of illustration is described in connection with a hydraulic brake comprising a rotatable brake drum 10 adapted to be mounted on a wheel 11 concentric to the axis of rotation. Disposed within the brake drum 10 are two arcuate peripherally expansible brake shoes 12 pivotally connected by a pin 21. Suitable means is provided for applying the brake shoes 12 to the drum 10, and in the present instance, this means comprises a cylinder 13 connected through a line 14 to a suitable source of pressure fluid (not shown). The cylinder 13 is mounted between the free ends of the shoes 12 on a plate 15 disposed in the open end of the drum 10 and secured against rotation relative to the axle 16 of the wheel 11. Slidably disposed in opposite ends of the cylinder 13 are two opposed pistons 17 operatively connected respectively to the free ends of the brake shoes 12. In the present instance, the free ends of the brake shoes 12 are formed with reduced extensions 18 rounded at their ends, and engaging in recesses 19 in the outer ends of the pistons 17. It will be evident that when pressure fluid is admitted to the cylinder 13, the pistons 17 will expand the brake shoes 12 into peripheral and frictional engagement with the brake drum 10. A suitable coil spring 20 is anchored at its ends to the free ends of the shoes 12, and serves to contract the latter when the brake is released.

When the brake is applied, the brake drum 10 will apply a rotational torque to the brake shoes 12. One of the important features of the present invention resides in determining the braking action by measuring this torque. To this end, the pivot pin 21 for the shoes 12 is disposed in a slot 22 in the free end of a lever 23 pivotally anchored on a pin 24 on the mounting plate 15. Formed integral with the lever 23 is a clevised arm 25, the free end of which projects into coacting relation with a yieldable abutment 26.

Movement of the arm 25 is limited by suitable spaced stop lugs 26a and 26b projecting at opposite sides thereof from the mounting plate 15. The stop lug 26a constitutes a positive anchor for the brake shoes when the drum 10 is rotating in a direction opposite to the direction of the arrow in Fig. 2. The stop lug 26b serves as a positive limiting stop in the event of excessive braking or when the yieldable abutment 26 is ineffective.

Preferably, the abutment 26 is a compression unit, such as a sealed corrugated bellows, one end of which is fixed to the mounting plate 15, and the other end of which is movable and in contact with the free end of the arm 25. The unit 26 is adapted to be filled with a suitable fluid, such as oil or water, and is connected through a pressure line 27 to a suitable indicating device 28. Interposed in the line 27 is an adjustable member or wall 29 for adjusting the reading of the device 28. It will be evident that the abutment 26 constitutes a movement detecting device for the brake shoes 12, and that its displacement is proportional to the braking torque. The arm 25 by reason of its length relative to the arm 23 substantially reduces the pressure on the abutment 26 and increases its proportional movement.

In the present embodiment of the invention, we have shown four brakes applied respectively to the four wheels 11 of an automobile. Hence, four lines 27 are connected to the indicating device 28.

While the indicating device 28 may be of any suitable type or form, in the present instance it comprises an outer casing 30 adapted to be mounted on the dash 31 of the automobile. Preferably the casing 30 is cylindrical in shape, and is closed at its rear end with an integral wall 32. The front end of the casing 30 is closed by a suitable cover glass 33 removably secured in place by a suitable flange ring 34.

Any suitable means responsive to the pressure in the unit 26 may be provided, and in the present instance a plurality of Bourdon tubes 35 to 39 are mounted in the casing 30. Preferably, the Bourdon tubes are mounted in alignment axially of the casing 30, and the fixed ends thereof are secured to a supporting block 40 extending along the bottom of the casing. The block 40 is formed with a plurality of passages 41 to 45 communicating with the fixed ends of the tubes 35 to 39. Four of these passages 41 to 44 communicate respectively with the four lines 27, and the fifth passage 45 communicates with a line 46 leading to the source of pressure fluid (not shown) for actuating the brakes.

The free ends of the Bourdon tubes 35 to 39 are connected respectively by suitable linkages 47 to 51 to a plurality of shafts 52 to 56. Preferably, the shafts are arranged concentrically, and extend axially of the casing 30. The inner shaft 52 is journaled at its rear end in the wall 32, and the outer shaft 56 is journaled in a dial 57 mounted in the casing 30 slightly back of the glass 33.

Secured respectively to the forward ends of the shafts 52 to 56 are a plurality of indicator needles 58 to 62 which overlie suitable scales 63 to 67 on the dial 57. To facilitate connecting the shafts to the tubes, and mounting the needles on the shafts, each shaft projects beyond the ends of the shaft directly journaled thereon. The scales 63 to 67 may be arranged in any suitable manner on the dial 57, but preferably are coincident radially. To facilitate reading the device 28, the needles 58 to 62 are varied progressively in length, and the foremost needles are bent rearwardly so as to position their points directly over the dial 57.

It will be evident that we have provided a novel means for registering the effectiveness of any one brake and the relative effectiveness of a plurality of brakes. The efficiency of each brake is indicated by comparing its action to the power applied thereto. Readings are made on a single dial, and the relative action of a plurality of brakes is indicated by the relative divergence of the corresponding indicating needles. Low effectiveness of any one or more brakes, and/or an unbalanced braking action can be easily detected, and can be accurately and expeditiously noted and corrected. The needles can be relatively adjusted to bring them to a zero reading by adjusting the members 29.

We claim as our invention:

1. A brake comprising, in combination, a brake drum, a brake shoe arranged to engage said drum, a fixed support, a yieldable abutment mounted on said support, a lever pivotally mounted on said support, said lever having one arm having a pin and slot connection with said shoe and having a second arm coacting with said yieldable abutment, means connected with said abutment for for indicating the yield thereof.

2. A brake comprising, in combination, a brake drum, a brake shoe arranged to engage said drum, a fixed support, a yieldable abutment mounted on said support, a lever pivotally mounted on said support, said lever having one arm having a pin and slot connection with said shoe and having a second arm coacting with said yieldable abutment, means connected with said abutment for indicating the yield thereof, and positive stop lugs disposed at opposite sides of said second arm to limit the movement thereof, said second arm being substantially longer than said first mentioned arm.

3. A brake comprising, in combination, a brake drum, a fixed support, a brake shoe having a floating connection with said support, said connection having an arm movable proportionately to movement of said shoe with said drum, means for bringing said shoe into frictional engagement with said drum, a sealed pressure fluid system comprising a pressure responsive member and a compressible abutment, said abutment being mounted on said support and coacting with said arm, and positive stops for limiting the movement of said arm in each direction of movement.

4. A device for indicating the braking action of an automobile brake comprising, in combination, a non-rotative support adjacent the brake, a lever pivotally mounted on said support and movable by the braking member of said brake, mechanism mounted on said support for yieldably resisting the movement of said lever, an indicator mounted on the dash of the automobile, and means connecting said indicator with said mechanism to permit said indicator to show the extent of the resistance offered by said mechanism.

5. A device for indicating the braking action of an automobile brake of the internal expanding type having a pair of shoes pivotally connected to each other in end-to-end relation, said device comprising, in combination, a lever connected to the pivotal connection of said shoes and movable by the circumferential movement of said shoes, means mounted adjacent said shoes for yieldably resisting the movement of said lever, an indicator mounted on the dash of the automobile for indicating the resistance offered by said means, and a connection between said means and said indicator.

6. A device for indicating the braking action of an automobile brake having a drum, a plate covering the face of said drum, and a pair of shoes enclosed within the drum and adapted to engage frictionally with said drum, said device comprising, in combination, a lever pivotally mounted on said plate and having one end connected to said shoes, means mounted on said plate within said drum for yieldably resisting movement of said lever, an indicator mounted on the dash of the automobile for indicating the resistance offered by said means, and a flexible connection between said means and said indicator.

7. In combination with the wheel of a vehicle including a brake drum, a brake shoe for engaging said drum, a stationary fulcrum, a lever pivotally mounted on the fulcrum and engaged by the shoe, and a pressure responsive device engaging the lever, said device having indicating means to indicate the different degrees of braking torque exerted by the shoe.

ROBERT W. WARING.
RICHARD J. FAHEY.